United States Patent
Kobayashi et al.

(10) Patent No.: US 9,243,307 B2
(45) Date of Patent: Jan. 26, 2016

(54) METHOD AND APPARATUS FOR REMOVING AND RECOVERING COPPER FROM COPPER-CONTAINING ACIDIC WASTE LIQUID AND METHOD FOR PRODUCING COPPER-CONTAINING SUBSTANCE

(75) Inventors: Atsushi Kobayashi, Tokyo (JP); Toshihiro Suzuki, Tokyo (JP); Kaori Sato, Tokyo (JP); Yoko Kubota, Tokyo (JP)

(73) Assignee: EBARA ENGINEERING SERVICE CO., LTD., Tokyo (JP)

( * ) Notice: Subject to any disclaimer, the term of this patent is extended or adjusted under 35 U.S.C. 154(b) by 0 days.

(21) Appl. No.: 12/812,252

(22) PCT Filed: Aug. 28, 2008

(86) PCT No.: PCT/JP2008/065919
§ 371 (c)(1),
(2), (4) Date: Jul. 9, 2010

(87) PCT Pub. No.: WO2009/090774
PCT Pub. Date: Jul. 23, 2009

(65) Prior Publication Data
US 2010/0294081 A1 Nov. 25, 2010

(30) Foreign Application Priority Data
Jan. 15, 2008 (JP) .................. 2008-006195

(51) Int. Cl.
*C22B 3/44* (2006.01)
*C01G 3/02* (2006.01)
(Continued)

(52) U.S. Cl.
CPC ... *C22B 3/44* (2013.01); *C01G 3/02* (2013.01); *C22B 3/02* (2013.01); *C22B 7/008* (2013.01);
(Continued)

(58) Field of Classification Search
USPC .................. 75/714, 718; 423/43; 210/702
See application file for complete search history.

(56) References Cited

U.S. PATENT DOCUMENTS 3,816,306 A * 6/1974 Roy .............................. 210/709
4,332,687 A * 6/1982 Daignault et al. ............ 210/721
(Continued)

FOREIGN PATENT DOCUMENTS

JP 50-16694 2/1975
JP 2002-233882 8/2002
(Continued)

OTHER PUBLICATIONS

Richardson et al, Ed. Coulson & Richardson's Chemical Engineering. vol. 3, Third Edition, (1994), p. 10.*
(Continued)

*Primary Examiner* — George Wyszomierski
*Assistant Examiner* — Tima M McGuthry Banks
(74) *Attorney, Agent, or Firm* — Wenderoth, Lind & Ponack, L.L.P.

(57) ABSTRACT

The present invention relates to a method and apparatus for removing and recovering copper by treating an acidic waste liquid containing copper ions such as an etching waste liquid resulting from etching a copper printed board in an etching solution of cupric chloride and a waste liquid after renewing a plating bath liquid in producing electrolytic copper foil. In particular, a copper recovering method of recovering copper from a copper-containing acidic waste liquid includes adding a liquid mixture of a copper-containing acidic waste liquid and an oxidizing agent to an alkaline agent solution while a pH of the alkaline agent solution to which the liquid mixture has been added is being controlled so as never to decrease to seven or lower, and by obtaining a solid material whose main component is copper oxide.

12 Claims, 5 Drawing Sheets

(51) Int. Cl.
*C22B 3/02* (2006.01)
*C22B 7/00* (2006.01)
*C22B 15/00* (2006.01)
*C02F 1/66* (2006.01)
*C02F 1/72* (2006.01)
*C02F 101/20* (2006.01)
*C02F 103/16* (2006.01)

(52) U.S. Cl.
CPC ............... *C22B 15/0089* (2013.01); *C02F 1/66* (2013.01); *C02F 1/722* (2013.01); *C02F 2101/20* (2013.01); *C02F 2103/16* (2013.01); *C02F 2209/06* (2013.01); *Y02W 30/54* (2015.05)

(56) References Cited

U.S. PATENT DOCUMENTS 5,560,838 A * 10/1996 Allies et al. ..................... 216/93
7,351,343 B2 * 4/2008 Huang et al. ................... 210/712
2006/0191376 A1 * 8/2006 Wu ................................ 75/353

FOREIGN PATENT DOCUMENTS

| JP | 2002-255550 | 9/2002 |
| JP | 2002-292373 | 10/2002 |
| JP | 2004-50096 | 2/2004 |

OTHER PUBLICATIONS

Haynes et al, Ed. CRC Handbook of Chemistry and Physics. 93rd edition, (2013), p. 4-10.*

International Search Report issued Dec. 9, 2008 in International (PCT) Application No. PCT/JP2008/065919.

* cited by examiner

Addition ratio of a liquid mixture

METHOD AND APPARATUS FOR REMOVING AND RECOVERING COPPER FROM COPPER-CONTAINING ACIDIC WASTE LIQUID AND METHOD FOR PRODUCING COPPER-CONTAINING SUBSTANCE

TECHNICAL FIELD

The present invention relates to a method and apparatus for removing and recovering copper by treating an acidic waste liquid containing copper ions such as an etching waste liquid resulting from a process of etching a copper printed board in an etching solution of cupric chloride and a waste liquid after renewing a plating bath liquid in a process of producing electrolytic copper foil. Further, the present invention relates to a method of producing a copper-containing substance by treating the above acidic waste liquid.

BACKGROUND ART

As an acidic waste liquid containing highly concentrated copper ions (hereinafter referred to as copper-containing acidic waste liquid), there have been known an etching waste liquid resulting from a process of etching a copper printed board in an etching solution of cupric chloride, a waste liquid after renewing a plating bath liquid in a process of producing electrolytic copper foil, and the like. These waste liquids contain copper whose concentration is as high as 5-20 percent by mass (hereinafter simply referred to as %), and contain coexisting chloride ions and sulfate ions whose concentrations are normally as high as 5-30%.

As a recovery treatment of copper from the copper-containing acidic waste liquid, there has been partly conducted a method of recovering metal copper precipitated by a reaction between copper ions and scrap iron caused by differences of ionization tendency of copper and iron. However, according to this method, a recovery rate of copper from the waste liquid is low, and there still remains waste liquid which contains iron ions eluted by the reaction with copper ions, and uncollected copper ions. Thus, it is hard to say that this method is an efficient treatment method because treatment of the remaining waste liquid is separately required.

Further, as a commonly-used method, there has been known a treatment method of removing heavy metals in the form of hydroxide precipitated by adding alkaline substances such as sodium hydroxide to the waste liquid. However, this method is unsuitable for treating the copper-containing acidic waste liquid which has a high concentration of copper ions because resultant sludge is bulky and large in amount.

Furthermore, as a treatment of the etching waste liquid, there has been attempted a treatment method for recovering copper in the form of copper oxide by adding alkaline substances in the waste liquid to change copper ions into insoluble hydroxide followed by adding an oxidizing agent to produce copper oxide (see e.g. Japanese laid-open patent publication No. 2004-50096 (patent application No. 2002-212857)). However, in this technique, when hypochlorite, chloride of lime or the like, each of which contains chloride ions, is used as the oxidizing agent, the concentration of chloride ions in the waste liquid after addition of the oxidizing agent becomes higher, thereby causing problems such as a formation of double salt of copper chloride and copper oxide and undesirable incorporation of salt content into the sludge. If the waste liquid is a liquid having a low concentration of copper ions, less than a few percent, such as washing wastewater after an etching process, this technique does not really cause a problem. However, in the case where the waste liquid that contains a high concentration of copper ions is treated, there remain problems to be solved, such as a problem of an increase of impurities contained in the recovered copper oxide.

On the other hand, when hydrogen peroxide is used as an oxidizing agent, the above-mentioned increase of salts does not occur. However, an efficient treatment of the waste liquid cannot be carried out because of the following problems. Specifically, when treating a strong acidic waste liquid having copper ions and chloride ions or sulfate ions which coexist in high concentrations, a solid material whose main component is a double salt of copper hydroxide and copper chloride or a double salt of copper hydroxide and copper sulfate is precipitated under conditions of a pH of about 1.5 or higher in a process of neutralization by adding an alkaline agent to the strong acidic waste liquid to change the pH level from an acidic property to a neutral or alkaline property. The solid material whose main component is the above double salt has a high concentration of impurities and is bulkier than copper oxide, and hence the recovery treatment efficiency is low. In particular, when treating the waste liquid containing highly-concentrated copper, the waste liquid changes into pasty sludge in the course of neutralization, thus causing difficulty in its treatment.

Further, the above double salts are hard to be decomposed by oxidization with hydrogen peroxide, and the double salts act as catalyst for decomposition of hydrogen peroxide. Therefore, even if hydrogen peroxide is added as an oxidization agent to the liquid in which the solid material has been precipitated, hydrogen peroxide is itself decomposed and consumed, thus causing a problem that the reaction is finished with the oxidization for producing copper oxide uncompleted.

In order to avoid a change of the treated waste liquid into the pasty object due to the precipitation of the solid material whose main component is the double salt, it is effective to dilute the waste liquid so that a concentration of copper ions is not more than about 10 g/L and a concentration of chloride ions or sulfate ions is not more than about 20 g/L during a neutralization treatment. However, in this treatment, there is a problem that a large amount of dilution water is required and accordingly a facility for this treatment becomes large.

Further, when treating a strong acidic waste liquid having copper ions and chloride ions or sulfate ions which coexist in high concentrations, such as an etching waste liquid containing copper ions, even if hydrogen peroxide is added to the acidic waste liquid containing copper in advance, a precipitate whose main component is the above-mentioned double salts is partly produced in the course of a neutralization reaction caused by adding an alkaline agent to the acidic waste liquid to change the liquid property from acidic to neutral or alkaline. Accordingly, most of hydrogen peroxide is catalytically decomposed and consumed. Then, the reaction of oxidization treatment for producing copper oxide is finished with the oxidization uncompleted due to a lack of the amount of hydrogen peroxide. In compensation for this, it is possible to improve the condition of oxidization treatment by adding hydrogen peroxide excessively to the waste liquid in anticipation of the lack of hydrogen peroxide during the oxidizing reaction. However, a large amount of additive chemicals is required, and thus such treatment is inefficient. Even in this case, the double salts which are not oxidatively decomposed with hydrogen peroxide still remain in sludge. A concentration of double salts can be reduced by rinsing the sludge with water sufficiently to remove the double salts from the sludge. However, a large amount of rinsing water is required and another treatment is required because copper ions are contained in rinsing wastewater, and thus such treatment is inefficient.

Furthermore, in these technologies, the treatment is conducted under the condition where a solution property is alkaline, i.e. a pH is in the range of eight to 12 by adding the alkaline agent to the acidic solution. Thus, neutralization treatment is required again in order to adjust a solution property to approximately neutral property in subsequent processes such as a dewatering process of the recovered solid material and a discharging process of a separated liquid. In this case, it is hard to say that this method is efficient because chemicals for re-neutralization are needed.

As described above, there has been no technology to recover only copper efficiently from copper-containing acidic waste liquids containing highly-concentrated copper ions and highly-concentrated salts like chloride ions which hinder the recovery and recycling of copper, and thus these waste liquids have been generally collected and discarded without recycling by industrial waste disposers.

SUMMARY OF THE INVENTION

It is therefore an object of the present invention to provide a method and apparatus for recovering copper in the form of solid material whose main component is copper oxide by treating a strong acidic waste liquid containing a highly concentrated copper such as an etching waste liquid containing copper chloride and a waste liquid after renewing a plating bath for an electrolytic copper foil which have been discarded as an industrial waste, in an efficient way and under a condition of a low amount of sludge generation.

Further, it is an object of the present invention to provide a method of producing a copper-containing substance by treating the acidic waste liquids.

Inventors of the present invention have studied intensively in order to solve the above objects and found the following matters, thus completing the present invention. Specifically, it was found that it is possible to remove and recover copper ions from a waste liquid in the form of insoluble copper oxide while avoiding a formation of double salts even in the waste liquid which has a high concentration of chloride ions, by mixing firstly an acidic waste liquid containing highly concentrated copper ions as a liquid to be treated, e.g. an etching waste liquid with an oxidizing agent to make a liquid mixture, and adding carefully the liquid mixture to an alkaline agent solution while keeping a predetermined pH range and mixing the liquid mixture with the alkaline solution. Further, it was found that a concentration of copper as ions in the liquid is kept low because of the successive oxidizing reaction and a formation of double salt can be avoided by utilizing a dilution effect of this liquid effectively, and a reaction for producing copper oxide from copper ions can be well kept and promoted by the oxidizing agent such as hydrogen peroxide, thus enabling copper oxide to be precipitated efficiently and enabling such treatment to make final liquid property weak alkaline or neutral. Here, the term "oxidizing reaction" is defined as a reaction for producing copper oxide as a result of a combination of copper ion and oxygen.

According to an aspect of the present invention, there is provided a copper recovering method of recovering copper from a copper-containing acidic waste liquid comprising: adding a liquid mixture of a copper-containing acidic waste liquid and an oxidizing agent to an alkaline agent solution while a pH of the alkaline agent solution to which the liquid mixture has been added is being controlled so as to never decrease to seven or lower; and obtaining a solid material whose main component is copper oxide.

According to an aspect of the present invention, there is provided a copper recovering apparatus for recovering copper from a copper-containing acidic waste liquid comprising: a reaction tank, to which an alkaline agent solution is supplied, for precipitating a solid material whose main component is copper oxide by allowing a liquid mixture of a copper-containing acidic waste liquid and an oxidizing agent to react with the alkaline agent solution; a solid-liquid separator for separating and recovering the solid material; and an oxidizing agent pipe and a copper-containing acidic waste liquid pipe which merge into a singe pipe. The merged pipe is provided so as to add the liquid mixture into the reaction tank; and the reaction tank and the solid-liquid separator communicate with each other so that a liquid containing the solid material can be transferred.

According to an aspect of the present invention, there is provided a copper recovering apparatus for recovering copper from a copper-containing acidic waste liquid comprising: a mixing tank for mixing a copper-containing acidic waste liquid and an oxidizing agent solution; a reaction tank, to which an alkaline agent solution is supplied, for precipitating a solid material whose main component is copper oxide by allowing a liquid mixture of a copper-containing acidic waste liquid and an oxidizing agent to react with the alkaline agent solution; an adding means for adding the liquid mixture from the mixing tank to the reaction tank; and a solid-liquid separator for separating and recovering the solid material. The reaction tank and the solid-liquid separator communicate with each other so that a liquid containing the solid material can be transferred.

According to an aspect of the present invention, there is provided a method of producing a copper-containing substance comprising: adding a liquid mixture of a copper-containing acidic waste liquid and an oxidizing agent to an alkaline agent solution while a pH of the alkaline agent solution to which the liquid mixture has been added is being controlled so as to never decrease to seven or lower; and producing a copper-containing substance whose main component is copper oxide.

According to the present invention, while the concentration of copper ions in the liquid is kept low because of the dilution effect of the alkaline solution, a primary oxidizing reaction can be carried out efficiently under the condition where a property of the liquid is strong alkaline, i.e. the pH is not less than 11.5 so that a reactivity of the oxidizing agent such as hydrogen peroxide is high, and then it is possible to obtain the final treated liquid which is near-neutral. Here, the term "oxidizing reaction" is defined as a reaction for producing copper oxide as a result of a combination of copper ion and oxygen.

Further, according to the present invention, it becomes possible to treat a strong acidic waste liquid containing highly concentrated copper ions such as an etching waste liquid which has been difficult to be treated so as to recover copper due to the formation of double salt according to a conventional technology. In the conventional technology, the waste liquid was treated under the alkaline property of liquid whose pH is in the range of eight to 12 by changing the acidic liquid to alkaline liquid regardless of the concentration of copper ions, and thus re-neutralizing operation was required for aftertreatment such as dewatering treatment of a recovered solid material and discharging treatment of a separated liquid. However, according to the present invention, the re-neutralizing operation is not required to save chemicals for re-neutralizing, and hence it becomes possible to perform efficient treatment.

In particular, in the conventional treatment technology, it has been difficult to treat the copper-containing acidic waste liquid having a high copper-ion concentration of 5-20% due to the formation of double salt, and so on. However, according to the present invention, the copper-containing acidic waste liquid having a high copper-ion concentration of 5-20% can be treated without diluting the waste liquid, thus providing very efficient treatment.

DETAILED DESCRIPTION OF THE INVENTION

Figure 1:
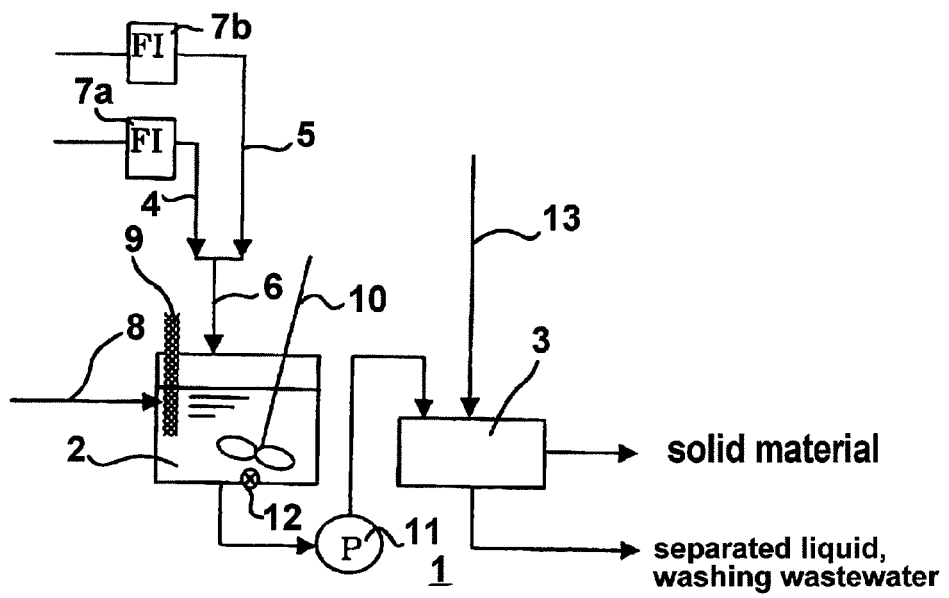
FIG. 1 is a view showing a copper recovery apparatus according to an embodiment of the present invention.

Treatment processes according to a method of the present invention comprise mixing firstly a copper-containing acidic waste liquid with an oxidizing agent to make a liquid mixture, adding the obtained liquid mixture to an alkaline solution carefully while controlling a pH of the alkaline solution, and producing a solid material containing copper recovered from the copper-containing acidic waste liquid.

A copper-containing acidic waste liquid to be treated in the method of the present invention is an acidic waste liquid which contains copper in the form of copper ion. The method of the present invention is applicable to concentration of copper ion or concentration of anion contained in the waste liquid without any constraints. In particular, the method of the present invention is preferably applicable to the waste liquid which has a high concentration of copper ions and a high concentration of salt, such as an etching waste liquid resulting from an etching process of etching a copper printed board in an etching solution of cupric chloride and a waste liquid after renewing a plating bath liquid in a process of producing electrolytic copper foil.

Further, as an oxidizing agent used in the method of the present invention, various kinds of oxidizing agents may be used as long as the oxidizing agent can change bivalent copper ion into copper oxide. Hydrogen peroxide and ozone water are effectively used as an oxidizing agent because these oxidizing agents can be treated as solution and component other than water does not remain after the oxidizing reaction. Hydrogen peroxide is especially suitable because no special device for generating hydrogen peroxide is needed and hydrogen peroxide is easy to handle. Further, ozone gas can be directly blown into the copper-containing acidic waste liquid to make a liquid mixture of the waste liquid and the oxidizing agent.

Further, as an alkaline agent used in the present invention, various kinds of alkaline agents may be used. Hydroxide of alkali metal is preferably used because hydroxide of alkali metal has no possibility to combine with possible coexisting anion to yield sedimentary salt. Then, sodium hydroxide is preferably used because sodium hydroxide is easily available at a low price. When an aqueous alkaline agent is available, it has an advantage of easy handling. A solid alkaline agent may be used after the solid alkaline agent is dissolved properly. When a solid alkaline agent is used, the solid alkaline agent may be dissolved and then supplied to a reaction tank. Alternatively, the solid alkaline agent may be supplied to a reaction tank in a solid state and then dissolved in the reaction tank serving also as a dissolution tank.

In a method of the present invention, treatment procedures in the above-mentioned order are especially important. An importance of sequential procedures of a mixing and a reaction in the present invention will be described below as an example where a hydrogen peroxide solution is used as an oxidizing agent solution and sodium hydroxide is used as an alkaline agent.

As described above in the conventional technology, in a sequence of adding the alkaline agent to the copper-containing acidic waste liquid which has a high concentration of copper ions, double salt is produced to precipitate sludge which is hard to be treated afterward.

Further, in a sequence of adding the copper-containing acidic waste liquid to the alkaline agent before mixing the copper-containing acidic waste liquid with hydrogen peroxide solution, a precipitation of copper hydroxide is preceded. Then, in a sequence of adding hydrogen peroxide solution to a mixture of the copper-containing acidic waste liquid and the alkaline agent, copper oxide is produced by oxidizing solid copper hydroxide precipitated in the liquid, and thus an efficiency of the oxidizing reaction caused by hydrogen peroxide is lowered.

Furthermore, when a waste liquid containing cuprous ion ($Cu^+$) such as an etching waste liquid is treated, cuprous chloride (CuCl) is also precipitated by adding the waste liquid to the alkaline agent before mixing the waste liquid with hydrogen peroxide. This precipitate of cuprous chloride (CuCl) acts as catalyst for decomposition of hydrogen peroxide to decompose and consume hydrogen peroxide, thus further lowering an efficiency of the oxidizing reaction caused by the hydrogen peroxide.

As described above, in a treatment process of the present invention, it is important to mix the copper-containing waste liquid and the hydrogen peroxide solution before the waste liquid to be treated is mixed with the alkaline agent solution and reacts with the alkaline agent solution. In this manner, the oxidizing reaction in which cupric ion ($Cu^{2+}$) contained in the waste liquid turns to copper oxide (CuO) can smoothly progress when the waste liquid is added to the alkaline agent. Further, when cuprous ion is contained in the waste liquid, even if the waste liquid contacts with the alkaline agent, a precipitation of cuprous salt such as cuprous chloride (CuCl) can be avoided by mixing the waste liquid with hydrogen peroxide before the waste liquid contacts with the alkaline agent, because cuprous ion is oxidized into cupric ion due to oxidizing action of hydrogen peroxide.

In the present invention, the necessary time for mixing the copper-containing waste liquid and the hydrogen peroxide solution depends on each concentration of the copper-containing waste liquid and the hydrogen peroxide solution to be mixed. However, when both concentrations are high, cuprous ion is oxidized in a substantial proportion in a short time of about five seconds, and in about 20 seconds, the oxidizing reaction progresses sufficiently to yield cupric ion. Here, the term "oxidizing reaction" is defined as a reaction in which cuprous ion turns to cupric ion.

Meanwhile, when the copper-containing acidic waste liquid and the hydrogen peroxide solution are mixed, a decomposition reaction of hydrogen peroxide progresses. The decomposition reaction becomes apparent at the time when about 60 seconds pass from the beginning of mixing the copper-containing acidic waste liquid and the hydrogen peroxide solution, and progresses intensively accompanying an obvious foam formation (gas generation) after seven minutes to ten minutes pass. A progress of the reaction depends on each concentration of the copper-containing waste liquid and the hydrogen peroxide solution. For example, when hydrogen peroxide whose molarity is two times that of copper ion is added to the waste liquid, the foam formation due to the decomposition of hydrogen peroxide is decreased after 20 minutes pass and becomes little after 25 minutes pass. Sediment which contains more copper hydroxide than copper oxide is produced in a case where at the time when 25 minutes pass since the copper-containing acidic waste liquid and the hydrogen peroxide solution are mixed to make a liquid mixture, the liquid mixture is added to the alkaline agent.

Considering each characteristic of the above reactions, the required mixing and reaction time of the copper-containing acidic waste liquid and the hydrogen peroxide solution prior to adding to the alkaline agent is preferably from five seconds to 20 minutes, and more preferably from 20 seconds to seven minutes. The setting for mixing and reaction time of the copper-containing acidic waste liquid and the hydrogen peroxide solution is the first characteristic of the present invention.

As a mixing method of the copper-containing waste liquid and the hydrogen peroxide solution, for example, a method of pouring the copper-containing waste liquid and the hydrogen peroxide solution into one or more mixing tanks and stirring them in the tank(s), a method of merging the copper-containing waste liquid and the hydrogen peroxide solution and mixing them, and other methods are applicable.

Of these methods, the method of pouring both of the waste liquid and the hydrogen peroxide solution into the mixing tank and stirring them in the mixing tank has a merit that confirmation and adjustment of the supplied amount are easy and an open system facility enables to avoid a problem of the foam formation (gas generation) when mixing.

Further, in the method of merging the copper-containing waste liquid and the hydrogen peroxide solution and mixing them, a method of connecting and merging both pipes of the waste liquid and the hydrogen peroxide solution with a Y-shaped pipe or the like, a method of mixing the waste liquid and the hydrogen peroxide solution by injecting one liquid (or solution) into the pipe of the other solution (or liquid), and other methods can be employed. Further, a static mixer may be used to stir and mix both of the waste liquid and the hydrogen peroxide solution after merging. In the method of mixing the waste liquid and the hydrogen peroxide solution after merging, the apparatus is required to be resistant to pressure to cope with the foam formation (gas generation) or is required to have a mechanism for discharging the generated gas. However, the apparatus has a merit that the time for mixing both liquids and supplying the liquid mixture to the alkaline agent solution can be kept constant and the liquid mixture can be supplied continuously. Further, the copper-containing waste liquid and the hydrogen peroxide solution can be supplied downward through the air above the liquid surface of the reaction tank and merged in the reaction tank. In this case, it is desirable that a baffle plate is placed in the downward flow to secure the reaction time and mixing state.

Next, a reaction between the alkaline agent and the liquid mixture of the copper-containing waste liquid and hydrogen peroxide solution (hereinafter referred to as "the liquid mixture") is required to take place under the condition where a concentration of copper as ions is low to avoid the formation of double salt. Further, in order to cause the oxidizing reaction of copper ions (formation of copper oxide) to progress smoothly, the reaction is preferably carried out under the condition of strong alkalinity in which hydrogen peroxide exhibits strong reactivity.

In order to attain these conditions, it is necessary that in a technology of the present invention, an alkaline agent in a solution state having good operability is used and the above-mentioned liquid mixture is poured at an appropriate speed into the alkaline agent solution while stirring the alkaline agent solution. It is necessary to control a speed of adding the liquid mixture to the alkaline agent solution so as to promote and complete the successive reaction by controlling a pH of the alkaline agent solution to which the liquid mixture has been added, so as to never decrease to seven or lower and preferably not to decrease to eight or lower. This point is the second characteristic of the present invention.

Further, as a method of adding the liquid mixture, for example, a method of adding the liquid mixture by drops into a reaction tank in which the alkaline agent solution is held, a method of supplying the liquid mixture to the alkaline agent solution through a pipe, and other methods are applicable.

Of the above methods, the method of adding the liquid mixture by drops into the reaction tank has a merit that a supplying condition can be visually observed, and can be easily adjusted when bad condition. On the other hand, in the method of supplying the liquid mixture to the alkaline agent solution through the pipe, there is a merit that an appropriate position for supplying the liquid mixture can be chosen in consideration of a distribution of a stirring stream, compared to the method of supplying the liquid mixture by drops from above the surface of the alkaline agent solution.

In the case where a capacity of the mixing tank for mixing the copper-containing acidic waste liquid and the hydrogen peroxide solution is much smaller than that of the reaction tank, and after stirring and mixing the copper-containing acidic waste liquid and the hydrogen peroxide solution which have been put into the mixing tank, the liquid mixture held in the mixing tank is added to the alkaline agent solution held in the reaction tank at one time, thereby completing addition of a desired amount of liquid mixture from the mixing tank to the reaction tank within the above-mentioned limited mixing and reaction time under the condition where the pH never decreases to seven or lower, a treatment can be conducted without a facility for controlling the addition of the liquid mixture from the mixing tank to the reaction tank, for example, a flow regulator, thus making the facility simple. Further, there is a method in which a plurality of mixing tanks are prepared, and the liquid mixture is added from a part of the mixing tanks to the reaction tank and concurrently the copper-containing acidic waste liquid and the hydrogen peroxide solution are mixed and react each other in the remaining mixing tanks so as to prepare for the subsequent addition, thereby improving a treatment efficiency, or a method in which a complete mixing state is formed in the mixing tank and a waiting time for adding the liquid mixture to the reaction tank is adjusted within the above-mentioned limited time.

In the method of adding the liquid mixture to the solution through the pipe, a method of adding a liquid mixture prepared by merging the copper-containing waste liquid and the hydrogen peroxide solution to the alkaline agent solution continuously is preferably employed.

As a method of adding the liquid mixture to the alkaline agent solution and mixing them while controlling the pH so as never to decrease to seven or lower, there are a method of adding a small amount of the liquid mixture intermittently to the alkaline agent solution in a stirred state and a method of adding the liquid mixture continuously with a small amount to the alkaline agent solution. In these methods, the amount of the liquid mixture added to the alkaline agent solution can be arbitrarily adjusted within a predetermined range (as described below) as long as the pH of the alkaline agent solution never decreases to seven or lower and the final pH when completing the reaction is not less than seven, preferably not less than eight. By this operation, while obtaining the dilution effect of the alkaline agent solution, a primary oxidizing reaction can be carried out efficiently under the strong alkaline condition of the pH in the range of 11.5 to 14.5 in which the reactivity of hydrogen peroxide is high and a treated solution containing a low concentration of copper as ions can be obtained by allowing the oxidizing reaction to progress successively and to be completed.

Further, at a stage in which acid and alkaline agent become substantially equivalent in amount, the amount of the treated liquid having a low copper ion concentration obtained as a result of the reactions becomes relatively large, compared to the amount of the added liquid mixture. Therefore, due to the dilution effect of the treated liquid resulting from the reactions, the formation reaction of copper oxide by oxidizing copper ion with hydrogen peroxide can be kept well and can progress efficiently while avoiding the formation of double salt even under the weak alkaline or neutral condition of the pH in the range of seven to 11, preferably eight to ten. In this manner, copper oxide can be efficiently precipitated and the treatment in which the final treated liquid becomes substantially neutral can be conducted.

Meanwhile, the concentration of hydrogen peroxide used in the above treatment is not restricted, for example a 30% concentrated hydrogen peroxide available in the market can be used directly without any adjustment. Similarly, the concentration of alkaline agent solution is not restricted, for example, a 25% concentrated sodium hydroxide solution can be used directly without any adjustment.

As described above, according to the technology of the present invention, a solid material obtained after treatment of the copper-containing acidic waste liquid contains copper oxide as main component, and the solid material has a property of relatively easy solid-liquid separation, relatively good dewaterability, and easy recovery operation. However, in the case of the copper-containing acidic waste liquid which contains highly concentrated copper ions, because strong acid and strong alkali are mixed for treatment, the solid material after completion of the reaction coexists with highly concentrated salts produced by the neutralization reaction. In recovering the solid material for the purpose of reuse, it is effective to repeat rinsing of the solid material several times to wash the salts away, thereby improving the purity of the recovered substance. As a solid-liquid separation method, for example, a filtration separation, a centrifugal separation, a sedimentation separation or the like is applicable.

As rinsing water for washing the salts away, clear water having a low salt content, for example, tap water or industrial water may be used. Alternatively, it is effective that a separated liquid obtained by solid-liquid separation of the treated water, a washing wastewater resulting from washing the solid material and/or a treated water obtained by desalination treatment of a separated liquid obtained by the solid-liquid separation are reused. In this case, as a desalination treatment method, for example, a membrane filtration, a distillation under reduced pressure and an electrodialysis are applicable.

Next, a recovery apparatus for use in carrying out the method of the present invention will be described below with reference to the accompanying drawings.

FIG. 1 is a process flow diagram showing a copper recovery apparatus according to an embodiment of the present invention. In the drawings, each reference numeral denotes a corresponding member as follows:
1: a copper recovery apparatus, 2: a reaction tank, 3: a solid-liquid separator, 4: a waste liquid pipe, 5: an oxidizing agent supply pipe, 6: a mixture pipe, 7: a flow regulator. 8: an alkali supply pipe, 9: a pH meter, 10: a stirrer, 11: a feed pump, 12: a liquid level gauge, 13: a rinsing water supply pipe.

The copper recovery apparatus 1 shown in FIG. 1 has the stirrer 10, the reaction tank 2 having the pH meter 9 and the liquid level gauge 12, the solid-liquid separator 3 which communicates with the reaction tank 2 through the feed pump 11. The mixture pipe 6 formed by the union of the waste liquid pipe 4 and the oxidizing agent supply pipe 5 is provided above the reaction tank 2 so that a liquid mixture of the copper-containing acidic waste liquid and the oxidizing agent can be supplied to the reaction tank 2.

Amounts of the copper-containing acidic waste liquid and the oxidizing agent both of which are supplied to the reaction tank are respectively controlled by a flow regulator 7a provided in the waste liquid pipe 4 and by a flow regulator 7b provided in the oxidizing agent supply pipe 5, thereby producing the liquid mixture at the appropriate ratio in the mixture pipe 6.

An alkaline agent solution is supplied to the reaction tank 2 through the alkali supply pipe 8. The liquid mixture of the copper-containing acidic waste liquid and the oxidizing agent is added from the liquid mixture pipe 6 to the alkaline agent solution which is being stirred with the stirrer 10 and concurrently a change of pH is measured with the pH meter 9 and the pH is controlled by the flow regulators 7a and 7b so that the pH never decreases to seven or lower.

A solid material containing copper oxide as a main component which is formed in the reaction tank 2 is fed by the feed pump 11 to the solid-liquid separator 3 which performs separation into a solid material and a separated liquid. Then, the solid material is rinsed with rinsing water supplied from the rinsing water supply pipe 13, and is served for reuse.

Figure 2:
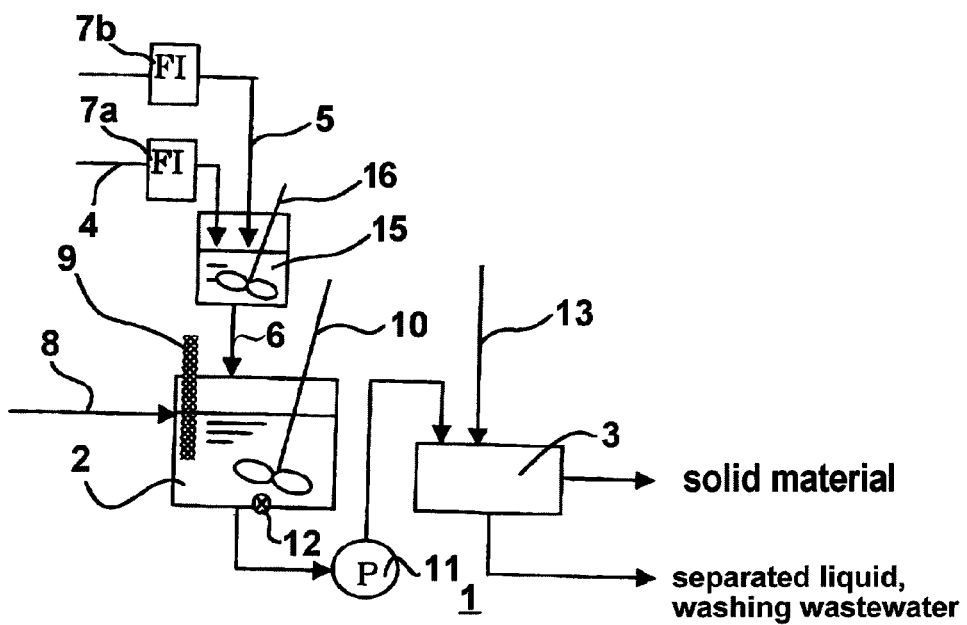
FIG. 2 is a view showing a copper recovery apparatus according to another embodiment of the present invention.

A process flow diagram shown in FIG. 2 is a view showing a copper recovery apparatus according to another embodiment of the present invention. In FIG. 2, reference numerals from 1 to 13 respectively denote the same or corresponding members shown in FIG. 1. Reference numeral 15 denotes a mixing tank and reference numeral 16 denotes a mixing tank stirrer.

In the apparatus shown in FIG. 1, the waste liquid pipe 4 and the oxidizing agent supply pipe 5 are joined together to form the liquid mixture pipe 6. In the apparatus shown in FIG. 2, the waste liquid pipe 4 and the oxidizing agent supply pipe 5 are respectively provided above the mixing tank, and the waste liquid and the oxidizing agent are mixed sufficiently in the mixing tank 15 by the mixing tank stirrer 16 and are then supplied in a mixed state to the reaction tank 2 through the liquid mixture pipe 6.

The mixing tank 15 does not need to be so large in capacity as to contain a total amount of the copper-containing acidic waste liquid to be treated and the oxidizing agent to be added to the waste liquid at a time because an oxidizing power of the oxidizing agent does not last long. The mixing tank 15 should have such a capacity as to contain the copper-containing acidic waste liquid separately-treated and the oxidizing agent required for the separately-treated waste liquid.

When the apparatus shown in FIG. 2 is used, the copper-containing acidic waste liquid separately-treated and the oxidizing agent required for the separately-treated waste liquid are added to the mixing tank 15 while controlling their flow rates with the flow regulator 7a provided in the waste liquid pipe 4 and the flow regulator 7b provided in the oxidizing agent supply pipe 5. Then, the copper-containing acidic waste liquid and the oxidizing agent are mixed in the mixing tank 15 to make a liquid mixture, and the liquid mixture is carefully supplied little by little from the liquid mixture pipe to the reaction tank while measuring the pH of an alkaline agent solution with the pH meter 9 installed in the reaction tank 2 and keeping the pH so as never decreases to seven or lower.

Figure 3:
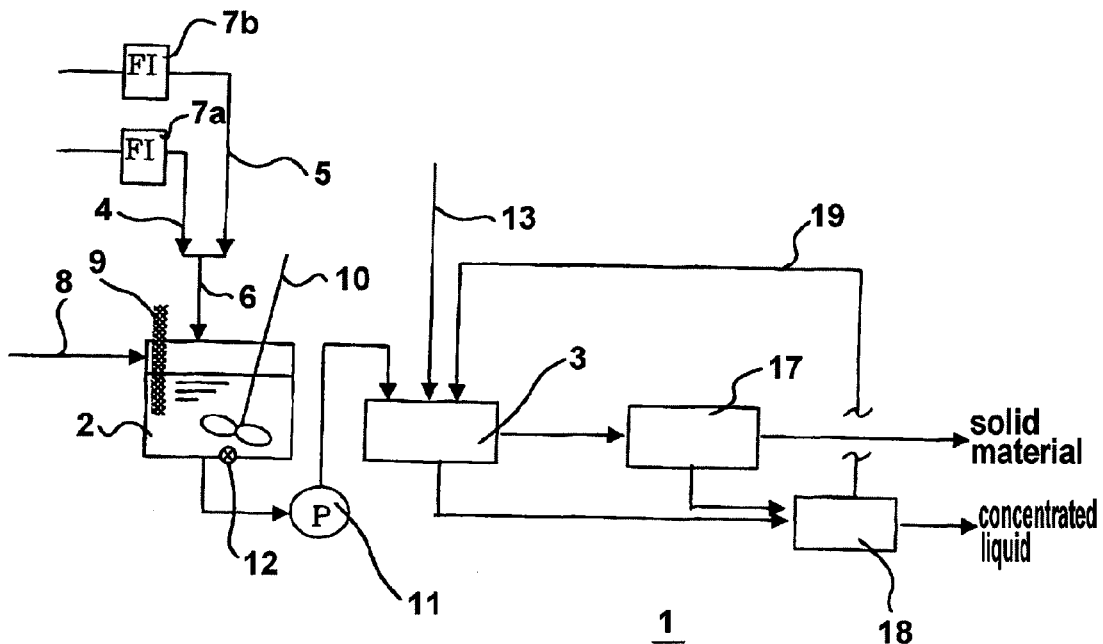
FIG. 3 is a view showing a copper recovery apparatus having a desalination apparatus according to an embodiment of the present invention.

FIG. 3 is a view showing a copper recovery apparatus in which a desalination apparatus is provided according to another embodiment of the present invention. This copper recovery apparatus is basically similar to the apparatus shown in FIG. 1, but is different therefrom in that a concentrating and dewatering unit 17, a desalination apparatus 18 and a desalted treated water pipe 19 are provided downstream of the solid-liquid separator.

In this apparatus, a separated liquid separated and removed in the solid-liquid separator 3 is desalted in the desalination apparatus 18, and then reused through the desalted treated water pipe 19 as rinsing water in the solid-liquid separator 3. Further, a solid material rinsed and separated in the solid-liquid separator 3 is transferred to the concentrating and dewatering unit 17, and further concentrated and dewatered in the concentrating and dewatering unit 17. A resulting concentrated and dewatered solid material is recovered and reused as copper material. On the other hand, resulting separated water is desalted in the desalination apparatus 18, and then reused through the desalted treated water pipe 19 as rinsing water in the solid-liquid separator 3 as in the case of the above separated liquid.

In the apparatus of the present invention, clear water having a low salt content generally, for example, industrial water is used as rinsing water. In the apparatus shown in FIG. 3, instead of the above clear water or as part of the clear water, the separated liquid obtained from the reaction or the desalted treated water obtained in the desalination apparatus in which washing wastewater and dewatered filtrate from the concentrating and dewatering unit are desalted can be used, and thus this apparatus is effective in view of wastewater treatment at a subsequent stage.

Next, embodiments of the present invention will be described in detail. However, it should be understood that the present invention is not restricted to these embodiments.

Embodiment 1

(1) An etching waste liquid (in which a pH was −1.2, a concentration of copper ions was 120 g/L and a concentration of chloride ions was 220 g/L, hereinafter referred to as "etching waste liquid") resulting from a process of etching a copper printed board in an etching solution of cupric chloride was treated. In a treatment method, the etching waste liquid was mixed with a hydrogen peroxide solution to make a liquid mixture, and one-tenth amount of a certain amount of the liquid mixture which is to be added to and mixed with a sodium hydroxide solution so that the pH of the resulting mixture will become 7.2 was taken. Then, the liquid mixture was added to the sodium hydroxide solution by one-tenth amount of the certain amount of the liquid mixture in a stepwise manner.

As a hydrogen peroxide solution to be added to the etching waste liquid, a 30% hydrogen peroxide solution was used, and a mixing ratio was set so that a mole number of the hydrogen peroxide is two times that of the copper ions contained in the etching waste liquid. Further, a 25% sodium hydroxide solution was used. When treating 1,000 mL of the etching waste liquid, a calculated amount of the 25% sodium hydroxide solution required to make a pH of the sodium hydroxide solution, to which the liquid mixture is added, 7.2 was 870 mL. A calculated amount of the 30% hydrogen peroxide solution whose mole number is required to become two times that of the copper ions contained in the etching waste liquid was 380 mL.

(2) A treatment was carried out as follows:

100 mL of the etching waste liquid and 38 mL of the hydrogen peroxide solution were respectively taken and mixed together to make a liquid mixture and the liquid mixture was allowed to stand still for 60 seconds, and then the liquid mixture was added little by little for two minutes to the 870 mL of the 25% sodium hydroxide solution which was being stirred. While adding the liquid mixture, the pH of the sodium hydroxide solution after addition of the liquid mixture was observed with a pH meter so as never to decrease to seven or lower.

After the liquid mixture was added to the sodium hydroxide solution, the sodium hydroxide solution was left for three minutes while being stirred. Then, the same amount of the etching waste liquid as the above and the same amount of the hydrogen peroxide solution as the above were mixed and allowed to stand still for 60 seconds to make a liquid mixture. Then, in the same manner as the previous operation, the liquid mixture was added for two minutes to the sodium hydroxide solution while the pH is observed, and further stirring of the mixed liquid was continued for three minutes.

The above operation was repeated until nine-tenth of the total amount of the liquid mixture comprising the etching waste liquid and the hydrogen peroxide solution was added to the sodium hydroxide solution. Specifically, the above operation of adding the liquid mixture to the sodium hydroxide solution was repeated nine times.

Thereafter, the same amount of the etching waste liquid as the above and the same amount of the hydrogen peroxide solution as the above were mixed and allowed to stand still for 60 seconds to make a liquid mixture, and then the liquid mixture was added little by little for five minutes to the sodium hydroxide solution while the pH of the mixed liquid after addition is observed so as never to decrease to seven or lower, and further stirring of the mixed liquid was continued for 30 minutes.

Figure 4:
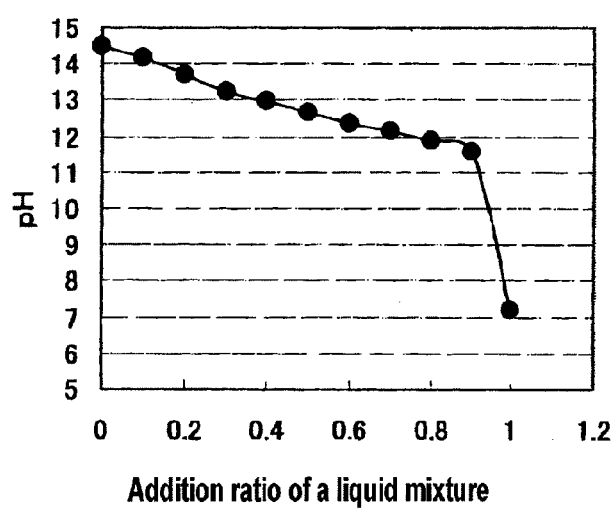
FIG. 4 is a graph showing a relationship between an addition ratio of a liquid mixture of an etching waste liquid and hydrogen peroxide and a pH of a sodium hydroxide solution after addition of the liquid mixture.

A relationship between a pouring ratio (addition ratio) of the liquid mixture comprising the etching waste liquid and the hydrogen peroxide solution and a pH of the sodium hydroxide solution after addition of the liquid mixture is shown in FIG. 4. In FIG. 4, the addition ratio of "1" means the point at which the total amount of the liquid mixture comprising 1,000 mL of the above-mentioned etching waste liquid and 380 mL of the hydrogen peroxide solution was added to 870 mL of the sodium hydroxide solution.

(3) Black sludge was obtained by the treatment operations mentioned in the above (2). The concentration of solid material in the sludge was 72 g/L, and the volume percent of sludge after the sludge was allowed to stand still for 30 minutes (SV30) was 58% and the volume percent of sludge after the sludge was allowed to stand still for 60 minutes (SV60) was 40%, with respect to the volume of the original sludge liquid. In this embodiment, "the original sludge liquid" means the sludge before the sludge was allowed to stand still. The same is true in the following embodiments and comparative examples. A supernatant obtained after a still standing of the sludge was clear and colorless and the concentration of soluble copper in the supernatant was less than 1 mg/L. Here, SV30 and SV60 show respectively the degree of volume ratio of the solid material which settles down in the sludge after 30 minute still standing and 60 minute still standing, namely SV30 and SV60 are one of indexes showing a sedimentation tendency of the solid material in the sludge.

Figure 5:
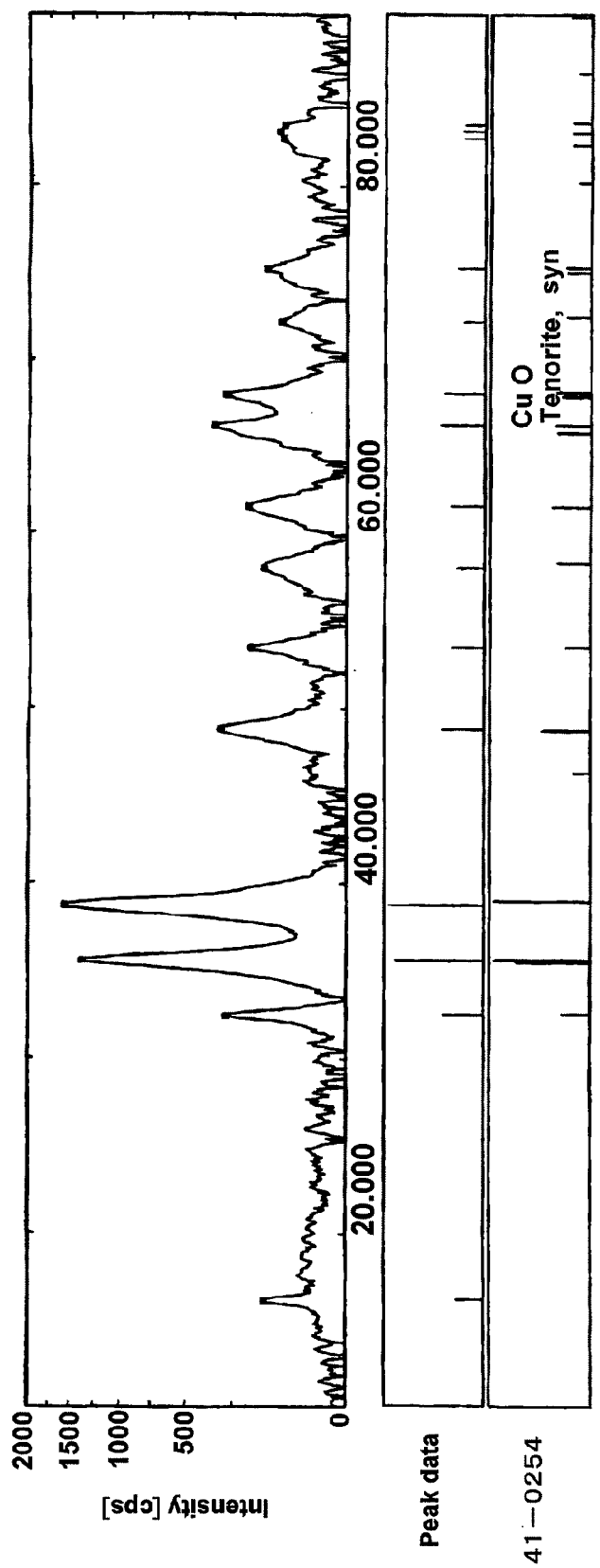
FIG. 5 is a diagram showing analysis result of a X-ray diffraction analyzer for analyzing a recovered substance (after drying) obtained in an embodiment 1.

The solid material in the sludge obtained from the above treatment was separated by centrifugation and the supernatant was removed. Then, the tap water whose amount corresponds to one-half the amount of the removed supernatant was added to the sludge and the sludge was stirred. Then, further washing operation by centrifugation was repeated two times. The solid material after being washed was dried and constituents of the recovered substance were analyzed with a powder X-ray diffractometry (X-ray diffraction device; RINT2200 from Rigaku Corporation, X-ray tube; Cu, current/voltage; 40 kV/40 mA). The result of the analysis is shown in FIG. 5. All of main analyzed diffraction peak patterns belonged to the diffraction peak patterns (shown by 41-0254) of copper oxide (CuO), thereby showing that the recovered substance whose main component is copper oxide was obtained. The purity of copper oxide in the recovered substance was 95%. As described above, the solid material obtained from the treatment according to the technology of the present invention contains copper oxide as main component. The solid-liquid separation is relatively easy, the dewaterability is relatively high, and the recovering operation is easy because of the nature of the solid material.

Embodiment 2

The same etching waste liquid, the same hydrogen peroxide solution and the same sodium hydroxide solution as those used in the embodiment 1 were used and the mixing ratio thereof was not changed. However, the treatment was carried out in a different way. In the treatment method in this embodiment, the etching waste liquid was mixed with a hydrogen peroxide solution to make a liquid mixture, and one-half amount of a certain amount of the liquid mixture which is to be added to and mixed with a sodium hydroxide solution so that the pH of the resulting mixture will become 7.2 was added to the sodium hydroxide solution. Then, one-quarter amount of the liquid mixture, one-eighth amount of the liquid mixture and one-sixteenth amount of the liquid mixture were added to the sodium hydroxide solution in a stepwise manner so that the reaction progresses, and finally one-sixteenth amount of the liquid mixture was added to the sodium hydroxide solution so as to complete the reaction.

First, the etching waste liquid (500 mL) and the hydrogen peroxide solution (190 mL) which correspond to one-half amount of the liquid mixture were taken respectively and mixed together to make a liquid mixture and the liquid mixture was allowed to stand still for 60 seconds. Then, the liquid mixture was added little by little for five minutes to the 25% sodium hydroxide solution (870 ml) which was being stirred, and while adding the liquid mixture, the pH of the sodium hydroxide solution after addition of the liquid mixture was observed with a pH meter so as never to decrease to seven or lower. After the liquid mixture was added to the sodium hydroxide solution, the sodium hydroxide solution was left for ten minutes while being stirred.

Next, the etching waste liquid (250 mL) and the hydrogen peroxide solution (95 mL) which correspond to one-quarter amount of the liquid mixture were taken respectively and mixed together to make a liquid mixture and the liquid mixture was allowed to stand still for 60 seconds. Then, the liquid mixture was added little by little for four minutes to the 25% sodium hydroxide solution which was being stirred, while the pH is observed as in the case with the previous operation. After the liquid mixture was added to the sodium hydroxide solution, the sodium hydroxide solution was left for six minutes while being stirred.

Further, the etching waste liquid and the hydrogen peroxide solution which correspond to one-eighth amount of the liquid mixture were taken respectively and mixed together to make a liquid mixture and the liquid mixture was allowed to stand still for 60 seconds. Then, the liquid mixture was added little by little for two minutes to the 25% sodium hydroxide solution which was being stirred, while the pH is observed. After the liquid mixture was added to the sodium hydroxide solution, the sodium hydroxide solution was left for three minutes while being stirred. Thereafter, the etching waste liquid and the hydrogen peroxide solution which correspond to one-sixteenth amount of the liquid mixture were taken respectively and mixed together to make a liquid mixture and the liquid mixture was added to the 25% sodium hydroxide solution.

Finally, the remaining etching waste liquid and the hydrogen peroxide solution which correspond to one-sixteenth amount of the liquid mixture were mixed and allowed to stand still for 60 seconds. Then, the liquid mixture was added little by little for five minutes to the sodium hydroxide solution, while the pH is observed carefully so as to decrease to seven or lower. After the liquid mixture was added to the sodium hydroxide solution, the sodium hydroxide solution was left for 30 minutes while being stirred.

Black sludge was obtained by the treatment operations. The concentration of solid material in the sludge was 72 g/L, and the volume percent of sludge after the sludge was allowed to stand still for 30 minutes (SV30) was 60% and the volume percent of sludge after the sludge was allowed to stand still for 60 minutes (SV60) was 43%, with respect to the volume of the original sludge liquid. A supernatant obtained after a still standing of the sludge was clear and colorless and the concentration of soluble copper in the supernatant was less than 1 mg/L.

In conclusion, as in the case with the embodiment 1, copper was removed and recovered from the waste liquid in the form of the solid material which has a high ability of sedimentation separation.

Embodiment 3

The same etching waste liquid, the same hydrogen peroxide solution and the same sodium hydroxide solution as those used in the embodiment 1 were used and the mixing ratio thereof was not changed. However, the treatment was carried out in a different way. In the treatment method of this embodiment, the etching waste liquid and the hydrogen peroxide solution were continuously mixed at the same volume ratio as in the embodiment 1, namely at the volume ratio of the etching waste liquid to the hydrogen peroxide solution was 1:0.38. In other words, the etching waste liquid and the hydrogen peroxide solution were ceaselessly mixed each other and concurrently added to the sodium hydroxide solution little by little, while the pH of the sodium hydroxide solution to which the etching waste liquid and the hydrogen peroxide solution had been added was observed with a pH meter so as never to decrease to seven or lower. An operation of adding the etching waste liquid and the hydrogen peroxide to the sodium hydroxide solution was stopped when the pH reached eight and the sodium hydroxide solution was left for 30 minutes while being stirred.

In conclusion, as in the case with the embodiment 1, copper was removed and recovered from the waste liquid in the form of the solid material which has a high ability of sedimentation separation.

Comparative Example 1

While the same etching waste liquid as those used in the embodiment 1 was being stirred, a 25% sodium hydroxide solution was added to the etching waste liquid so that a pH was adjusted to be about nine (pH=9). In this neutralization operation, a pale-green colored solid material began to precipitate at the time when the pH became about 1.5 (pH≈1.5). As the additive amount of the sodium hydroxide solution was increased, the amount of the precipitated solid material was increased, and a pasty sludge that is hard to perform a solid-liquid separation was generated when the pH reached about four or higher.

Next, a certain amount of 30% hydrogen peroxide solution whose mole number is two times that of copper ions contained in the waste liquid was added to the solution (pasty sludge) whose pH was about nine (pH≈9) after neutralization, thus causing hydrogen peroxide to be decomposed with intense foam formation. The pasty sludge temporarily changed its color to brownish-red immediately after the addition of the hydrogen peroxide, but a nature of the sludge did not change, as it remained still pasty. Further, the color tone of the sludge turned to the original one in about 30 minutes.

Figure 6:
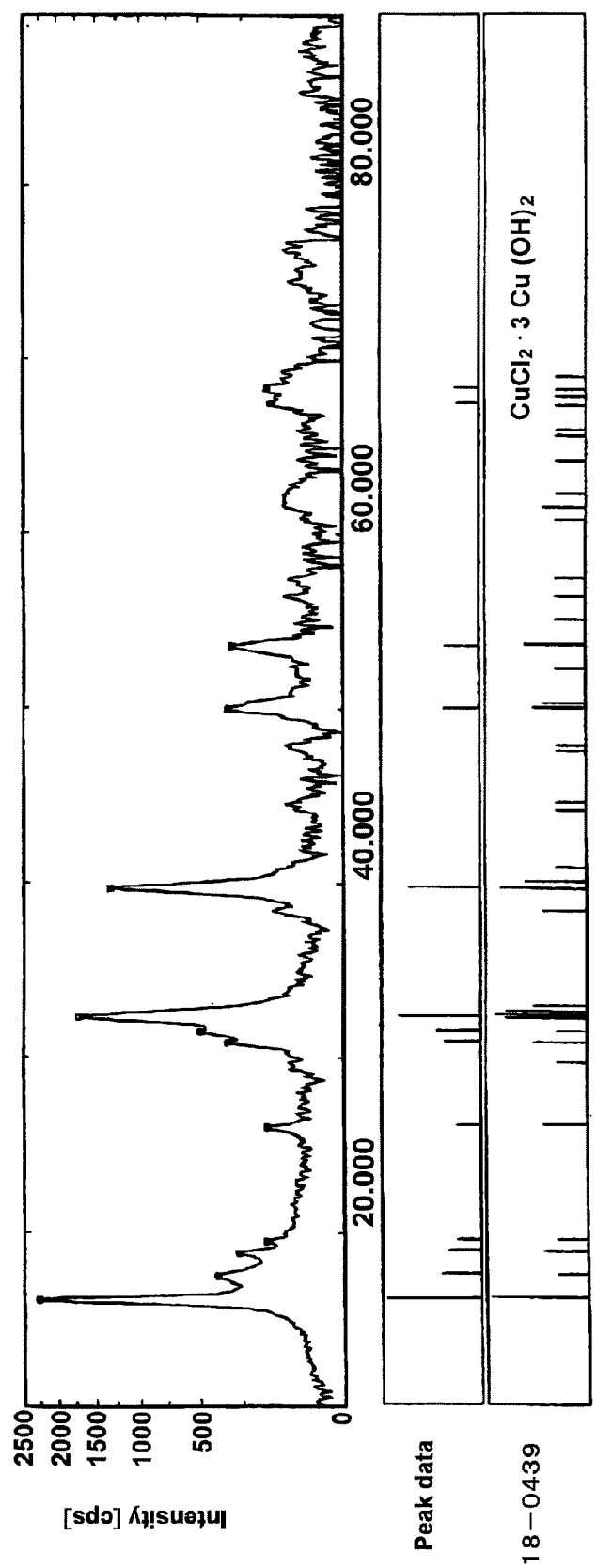
FIG. 6 is a diagram showing analysis result of a X-ray diffraction analyzer for analyzing a recovered substance (after drying) obtained in a comparative example 1.

The tap water in double amount to a volume of the sludge was added to the pasty sludge obtained from the above treatment, and the sludge and the tap water were stirred, and then washing operation by centrifugation was repeated twice. The constituents of the recovered substance obtained by drying the solid material after being washed were analyzed by a powder X-ray diffractometry using a X-ray diffraction device used in the embodiment 1. The result of the analysis is shown in FIG. 6. All of main analyzed diffraction peak patterns belonged to the diffraction peak pattern (shown by 18-0439) of double salt of copper chloride and copper hydroxide ($CuCl_2.3Cu(OH)_2$). Namely, the main component of the solid material obtained in this treatment was the double salt of copper chloride and copper hydroxide.

Comparative Example 2

A 30% hydrogen peroxide solution was added to the same etching waste liquid as that used in the embodiment 1 so that a mole number of the hydrogen peroxide can be two times that of the copper ions contained in the etching waste liquid, and the hydrogen peroxide solution and the etching waste liquid were mixed and then a liquid mixture was allowed to stand still for 60 seconds. Then, while the liquid mixture was being stirred, a 25% sodium hydroxide solution was added to the liquid mixture little by little and a pH was adjusted to be about nine (pH 9). Then, a stirring operation was continued for 75 minutes.

The sludge obtained in this treatment operation was brownish-red in its color. The result of this example was different from that of the comparative example 1, and it was understood that the sludge contains copper oxide. However, the concentration of solid material in the obtained sludge was 80 g/L, and the volume percent of sludge after the sludge was allowed to stand still for 30 minutes (SV30) was 100% and the volume percent of sludge after the sludge was allowed to stand still for 60 minutes (SV60) was 99%, with respect to the volume of the original sludge liquid. The production volume of the solid material of this example was larger than that of embodiment 1, and the solid material had a lower ability of sedimentation separation, compared to the solid material obtained from the embodiment 1.

Figure 7:
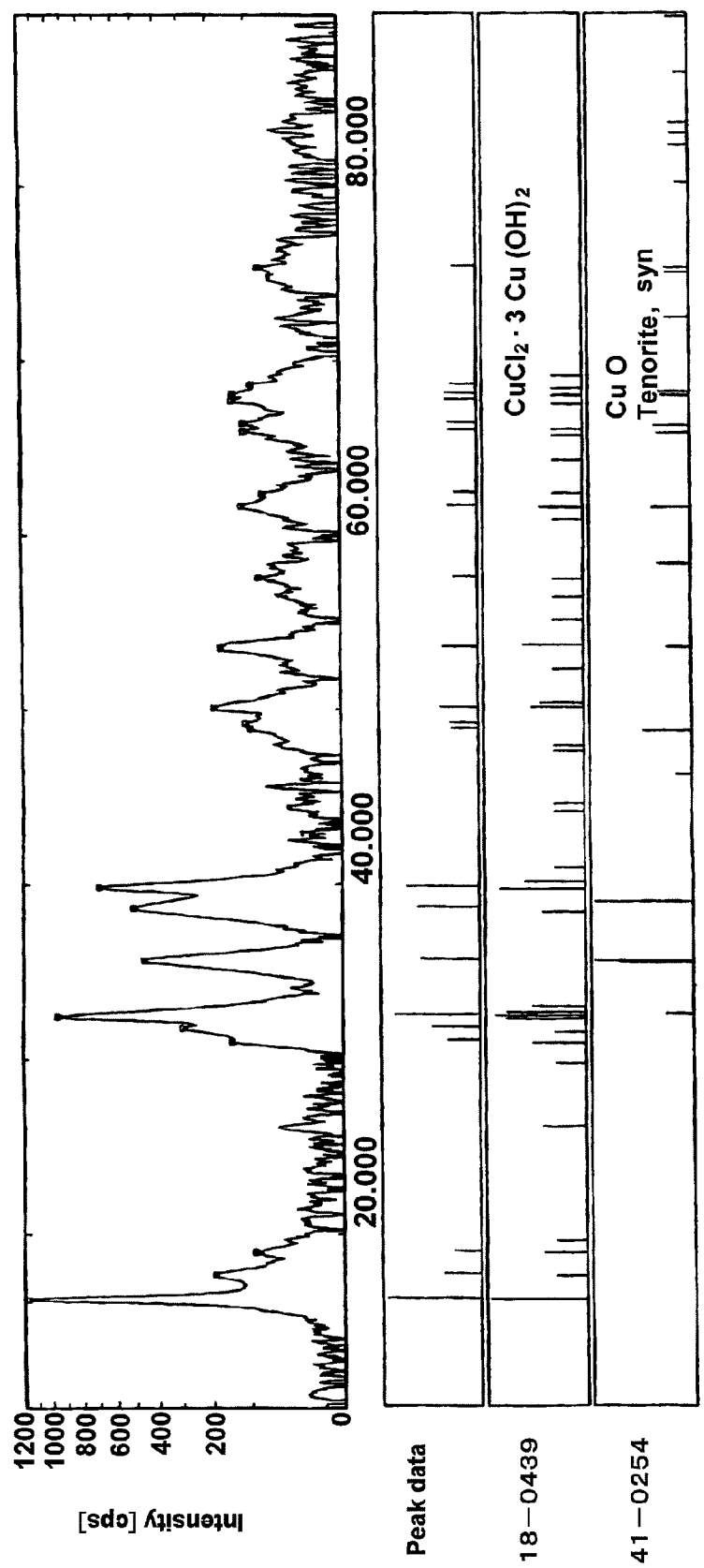
FIG. 7 is a diagram showing analysis result of a X-ray diffraction analyzer for analyzing a recovered substance (after drying) obtained in a comparative example 2.

The solid material in the sludge obtained from the above treatment was separated by centrifugation and the supernatant was removed. Then, the tap water whose amount corresponds to one-half the amount of the removed supernatant was added to the sludge, and the sludge and the tap water were stirred, and then washing operation by centrifugation was repeated twice. The constituents of the recovered substance obtained by drying the solid material after being washed were analyzed by a powder X-ray diffractometry using a X-ray diffraction device used in the embodiment 1. The result of the analysis is shown in FIG. 7. All of main analyzed diffraction peak patterns belonged to the diffraction peak pattern (shown by 18-0439) of double salt of copper chloride and copper hydroxide ($CuCl_2.3Cu(OH)_2$) or the diffraction peak pattern (shown by 41-0254) of copper oxide (CuO) Namely, the solid material obtained from this treatment contained the double salt of copper chloride and copper hydroxide, and the copper oxide.

Comparative Example 3

The time for allowing the liquid mixture of the etching waste liquid and the hydrogen peroxide solution to stand still was 25 minutes. The treatment operation was carried out under the same conditions as those of the embodiment 1, expect for the above time.

The sludge obtained in this treatment operation was blackish-brown in its color, and it was understood that the sludge contains a high percentage of copper oxide. However, the concentration of solid material in the sludge was 74 g/L, and the volume percent of sludge after the sludge was allowed to stand still for 30 minutes (SV30) was 99% and the volume percent of sludge after the sludge was allowed to standstill for 60 minutes (SV60) was 95%, with respect to the volume of the original sludge liquid. The production volume of the solid material of this example was larger than that of embodiment 1 and the solid material had a lower ability of sedimentation separation, compared to the solid material obtained from the embodiment 1.

Comparative Example 4

The same etching waste liquid, the same hydrogen peroxide solution and the same sodium hydroxide solution as those used in the embodiment 1 were used. One-tenth amount of a certain amount of the same etching waste liquid as in the embodiment 1 which is to be added to and mixed with the sodium hydroxide solution and the hydrogen peroxide solution so that the pH of the mixed liquid (the sodium hydroxide solution, the etching waste liquid and the hydrogen peroxide) will become 7.2 finally was added to a 25% sodium hydroxide solution followed by being stirred for 60 seconds. Then, the amount of a 30% hydrogen peroxide solution was added little by little for two minutes to the above mixed liquid of the etching waste liquid and the sodium hydroxide solution so that a mole number of the hydrogen peroxide will become two times that of the copper ions contained in the etching waste liquid, and then the resulting liquid was further stirred for two minutes. The above operation was repeated until nine-tenth of the etching waste liquid and the hydrogen peroxide solution respectively are added to the sodium hydroxide solution in the same manner as in the embodiment 1. Thereafter, the same amount of the etching waste liquid as the above was added to the sodium hydroxide solution and stirred for 60 seconds, and the same amount of the hydrogen peroxide solution as the above was added little by little for five minutes to the above mixed liquid, and then the resulting liquid was further stirred for 30 minutes.

The sludge obtained in this treatment operation was blackish-brown in its color, and it was understood that the sludge contains a high percentage of copper oxide. However, the concentration of solid material in the sludge was 77 g/L, and the volume percent of sludge after the sludge was allowed to stand still for 30 minutes (SV30) was 93% and the volume percent of sludge after the sludge was allowed to stand still for 60 minutes (SV60) was 89%, with respect to the volume of the original sludge liquid. The production volume of the solid material of this example was larger than that of embodiment 1 and the solid material had a lower ability of sedimentation separation, compared to the solid material obtained from the embodiment 1.

Embodiment 4

As a waste liquid to be treated, a waste liquid after renewing a plating bath liquid in a process of producing electrolytic copper foil (in which a pH was 0.0, a concentration of copper ions was 66 g/L, and a concentration of chloride ions was 169 g/L) was treated. A treatment was conducted according to the same reaction procedures, the same pH control and the same time conditions as those in the embodiment 1.

As a hydrogen peroxide solution to be added to the waste liquid after renewing a plating bath liquid, a 30% hydrogen peroxide solution was used, and a mixing ratio was set so that a mole number of the hydrogen peroxide can be two times that of the copper ions contained in the waste liquid. Further, a 10% sodium hydroxide solution was used. When treating 1,000 mL of the waste liquid after renewing a plating bath liquid, a calculated amount of the 10% sodium hydroxide solution and a calculated amount of the 30% hydrogen peroxide solution whose mole number was two times that of the copper ions contained in the waste liquid were 615 mL and 210 mL, respectively so that a pH of the liquid obtained by mixing the waste liquid after renewing the plating bath liquid, the hydrogen peroxide solution and the sodium hydroxide solution will become 7.2.

The sludge obtained from this treatment was black in its color. The concentration of solid material in the sludge was 40 g/L, and the volume percent of sludge after the sludge was allowed to standstill for 30 minutes (SV30) was 35% and the volume percent of sludge after the sludge was allowed to stand still for 60 minutes (SV60) was 25%, with respect to the volume of the original sludge liquid. A supernatant obtained after a still standing of the sludge was clear and colorless and the concentration of soluble copper in the supernatant was less than 1 mg/L.

Comparative Example 5

While the same waste liquid after renewing a plating bath liquid as that used in the embodiment 4 was being stirred, a 10% sodium hydroxide solution was added to the waste liquid so that a pH was adjusted to be about nine (pH≈9). In this neutralization operation, a pale-blue colored solid material began to precipitate at the time when the pH became about 1.5 (pH≈1.5). As the additive amount of the sodium hydroxide solution was increased, the amount of the precipitated solid material was increased and a pasty sludge that is hard to perform solid-liquid separation was generated when the pH became about four or more.

Next, a certain amount of 30% hydrogen peroxide solution whose mole number is two times that of copper ions contained in the waste liquid was added to the liquid (pasty sludge) whose pH was about nine (pH≈9) after neutralization, thus causing the hydrogen peroxide to be decomposed with intense foam formation. The pasty sludge temporarily changed its color to brownish-red immediately after the addition of the hydrogen peroxide, but a nature of the sludge did not change, as it remained still pasty. Further, the color tone of the sludge turned to the original one in about 30 minutes.

INDUSTRIAL APPLICABILITY

According to the present invention, it is possible to recover copper efficiently in an acidic waste liquid containing highly-concentrated copper such as an etching waste liquid or a waste liquid after renewing an electrolytic plating bath while avoiding a formation of double salt, and to precipitate copper in the form of insoluble oxide, thereby removing and recovering copper in the waste liquid economically and efficiently.

The invention claimed is:

1. A copper recovering method of recovering copper from a copper-containing acidic waste liquid comprising:
   combining a copper-containing acidic waste liquid with an oxidizing agent to obtain a predetermined amount of liquid mixture of the copper-containing acidic waste liquid and the oxidizing agent, said combining of the copper-containing acidic waste liquid with the oxidizing agent being performed for a predetermined period of time in a range of 5 seconds to 20 minutes;
   after said combining, adding the liquid mixture of the copper-containing acidic waste liquid and the oxidizing agent in increments of one-tenth of the predetermined amount into an alkaline agent solution while a pH of the resulting mixture of the alkaline agent solution and the liquid mixture is being controlled so as to never decrease to seven or lower; and
   obtaining a solid material whose main component is cupric oxide.

2. A copper recovering method of recovering copper from a copper-containing acidic waste liquid according to claim 1, wherein said combining to obtain the liquid mixture of the copper-containing acidic waste liquid and the oxidizing agent is performed by merging a copper-containing acidic waste liquid supply line and an oxidizing agent supply line together.

3. A copper recovering method of recovering copper from a copper-containing acidic waste liquid according to claim 1, wherein said combining to obtain the liquid mixture of the copper-containing acidic waste liquid and the oxidizing agent is performed by mixing the copper-containing acidic waste liquid and the oxidizing agent together in a mixing tank.

4. A copper recovering method according to claim 1, wherein said adding the liquid mixture of the copper-containing acidic waste liquid and the oxidizing agent comprises adding the liquid mixture to a reaction tank to which the alkaline agent solution is supplied, by dropping the liquid mixture or by pouring the liquid mixture through a pipe.

5. A copper recovering method of recovering copper from a copper-containing acidic waste liquid according to claim 1, wherein hydrogen peroxide is used as the oxidizing agent.

6. A copper recovering method of recovering copper from a copper-containing acidic waste liquid according to claim 1, wherein said adding of each increment of one-tenth of the predetermined amount of the liquid mixture into the alkaline agent solution is performed over a period of at least 2 minutes, followed by a period of at least 3 minutes of stirring of the alkaline agent solution without the addition of any additional portion of the liquid mixture.

7. A method of producing a copper-containing substance comprising:
　　combining a copper-containing acidic waste liquid with an oxidizing agent to obtain a predetermined amount of liquid mixture of the copper-containing acidic waste liquid and the oxidizing agent, said combining of the copper-containing acidic waste liquid with the oxidizing agent being performed for a predetermined period of time in a range of 5 seconds to 20 minutes;
　　after said combining, adding the liquid mixture of the copper-containing acidic waste liquid and the oxidizing agent in increments of one-tenth of the predetermined amount into an alkaline agent solution while a pH of the resulting mixture of the alkaline agent solution and the liquid mixture is being controlled so as to never decrease to seven or lower; and
　　producing a copper-containing substance whose main component is cupric oxide.

8. A method of producing a copper-containing substance according to claim 7, wherein said combining to obtain the liquid mixture of the copper-containing acidic waste liquid and the oxidizing agent is performed by merging a copper-containing acidic waste liquid supply line and an oxidizing agent supply line together.

9. A method of producing a copper-containing substance according to claim 7, wherein said combining to obtain the liquid mixture of the copper-containing acidic waste liquid and the oxidizing agent is performed by mixing the copper-containing acidic waste liquid and the oxidizing agent together in a mixing tank.

10. A method of producing a copper-containing substance according to claim 7, wherein said adding the liquid mixture of the copper-containing acidic waste liquid and the oxidizing agent comprises adding the liquid mixture to a reaction tank to which the alkaline agent solution is supplied, by dropping the liquid mixture or by pouring the liquid mixture through a pipe.

11. A method of producing a copper-containing substance according to claim 7, wherein hydrogen peroxide is used as the oxidizing agent.

12. A method of producing a copper-containing substance according to claim 7, wherein said adding of each increment of one-tenth of the predetermined amount of the liquid mixture into the alkaline agent solution is performed over a period of at least 2 minutes, followed by a period of at least 3 minutes of stirring of the alkaline agent solution without the addition of any additional portion of the liquid mixture.

* * * * *